Jan. 8, 1935.    R. WARREN    1,987,426
CLUTCH MECHANISM
Filed June 23, 1933    2 Sheets-Sheet 1

Jan. 8, 1935. R. WARREN 1,987,426
CLUTCH MECHANISM
Filed June 23, 1933 2 Sheets-Sheet 2

INVENTOR
Reginald Warren
BY Townsend & Decker
ATTORNEYS.

Patented Jan. 8, 1935

1,987,426

UNITED STATES PATENT OFFICE 1,987,426

CLUTCH MECHANISM

Reginald Warren, Reading, England, assignor to The Pulsometer Engineering Company Limited, Reading, England Application June 23, 1933, Serial No. 677,219
In Great Britain July 13, 1932

3 Claims. (Cl. 192—67)

This invention has reference to power transmission mechanism, such, for example, as automobile transmission systems in which a gear box as a whole is operatively disconnected from both the driving and driven shafts, the change in gear effected during this period of disconnection and the gear box as a whole then again operatively connected to both the driving and driven shafts.

It is an object of the invention to provide improved positive clutch mechanism and associated synchronizing means whereby the gear box and the driven shaft can readily be disconnected and re-connected without setting up noise or shock, in any part of the transmission system.

Another object is to provide improved positive clutch mechanism of the kind in which synchronization of the speeds of rotation of the positive clutch members to be engaged is effected with the aid of a device, sometimes referred to as a balking ring, adapted to be moved to a limited angular degree with respect to one clutch member by frictional engagement with the other, such balking ring comprising an annular mask gapped to correspond to the gaps of one clutch member upon which it is mounted in an angularly adjustable manner, and the construction being such that so long as the clutch and mask gaps do not completely register there is presented to the dogs of the second clutch member a surface beyond which they cannot penetrate and which is incapable of setting up jar or vibration.

In pursuance of the foregoing objects, positive clutch mechanism according to my present invention embodies a mask which differs from other masks in that it encircles its associated clutch member and is itself encircled by friction means connecting it to the second clutch member axial movement of which does not affect the friction means. This constant frictional slip which exists only when the clutch is open and which overcomes the objection of having to set up mechanical engagement of the parts when about to close the clutch, is only small and is localized to a region where wear, heating and accuracy of fit do not affect working.

Figure 1:
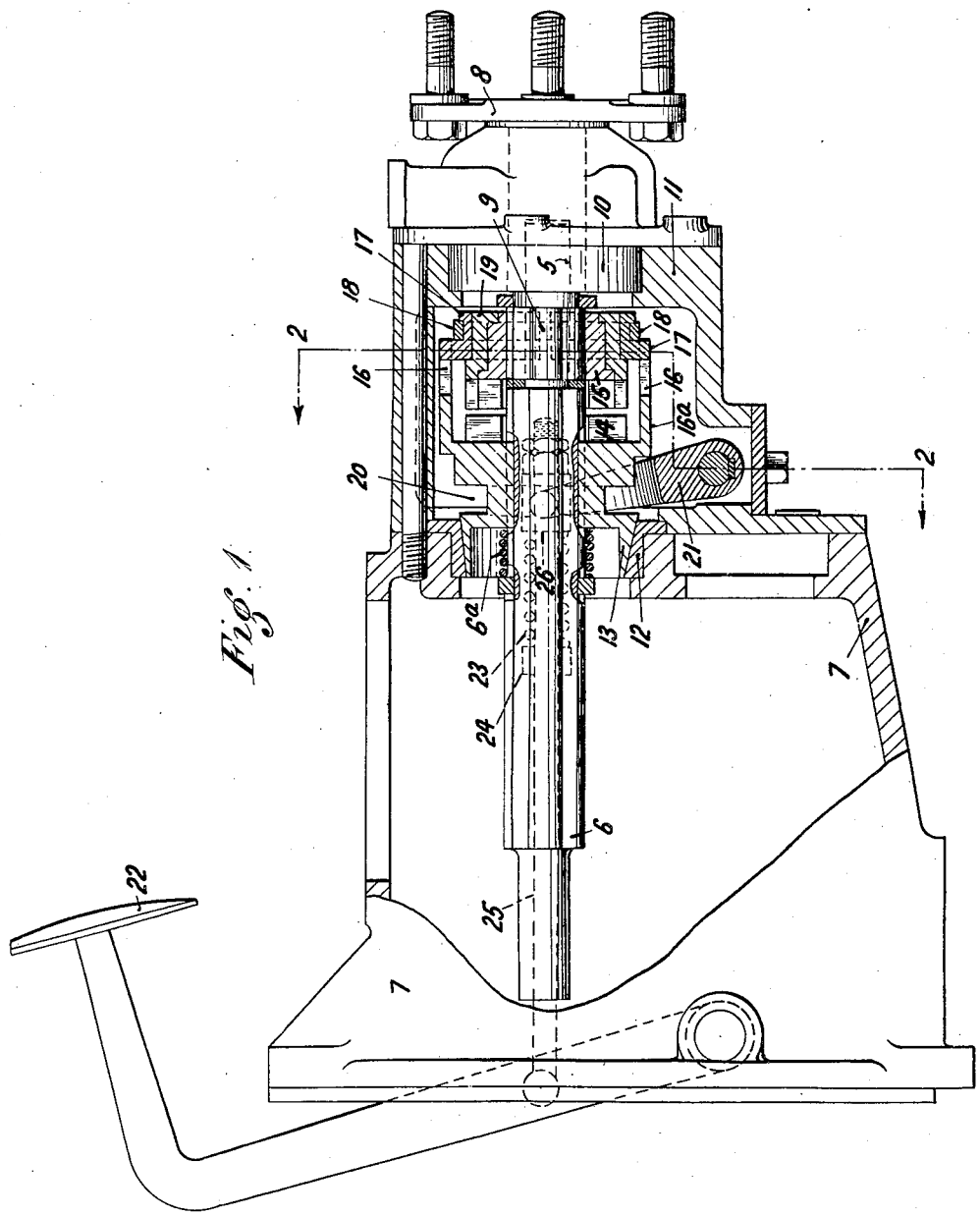
Figure 2:
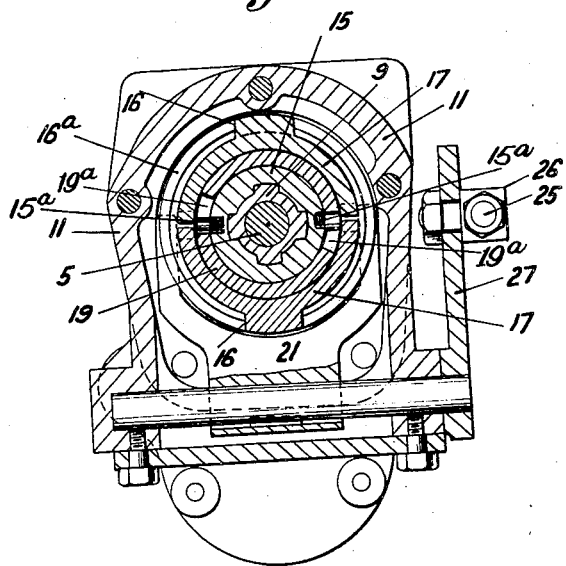
Figure 3:
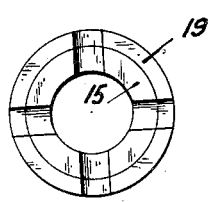
Figure 4:
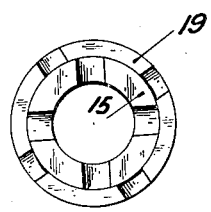

But in order that the invention may be more readily understood it will be further described with the aid of the accompanying drawings, wherein Fig. 1 is a part sectional side view of one arrangement, such that the gear box as a whole is first disconnected from the driving shaft and then from the driven shaft before changing gear. Fig. 2 is a cross section of the arrangement taken on the line 2—2 of Fig. 1, and Figs. 3 and 4 are detail views hereinafter referred to.

As here shown the end 5 of a shaft 6 which protrudes from the gear box 7 and is usually fitted directly with one member 8 of the coupling associated with a Cardan or propeller shaft, is fitted in a freely rotatable manner within a sleeve 9 forming part of said coupling member 8.

The said sleeve 9 is mounted in a ball bearing 10 carried by a spider or casing 11 attached to the gear box. Within the said spider or casing 11 and attached to the gear box is a brake drum or female brake member 12 with which cooperates a combined brake and clutch member 13 splined to slide upon the gear box shaft 6. The combined brake and clutch member 13 is so constructed as to serve as one member of a dog clutch (14 being the dogs), the other member 15 of which is fixed upon the sleeve 9 aforesaid. The combined brake and clutch member 13 upon the gear box shaft 6, which member is urged by a spring $6^a$ towards the positive clutch member 15, fixed on the sleeve 9, has a sliding connection, as by axially directed slots 16 in its cylindrical extension $16^a$ with a pair of friction shoes 17 encircled by a spring ring 18 so as to bear frictionally upon the mask, designated 19 which I mount upon the clutch member 15. This mask is movable as determined by suitable stops (such as pins $15^a$ in the member 15 cooperating with slots $19^a$ in the mask 19) between a position, Fig. 3, in which the gaps of both it and the clutch member 15 register and another position, Fig. 4, in which they do not register but result in presentation to the dogs 14 by said member and mask collectively of a plane surface which although of irregular outline is uninterrupted circularly. The clutch dogs 14 are radially of a length to enter the gaps of both the member 15 and mask 19, the arrangement being such that at any time after the dog clutch has been opened and there is a difference in speed in the two shafts sufficient to cause the mask 19 to move angularly upon its clutch member 15 the dogs 14 of the other clutch member cannot be re-engaged before synchronism has again been established and exceeded by the slight amount necessary to bring the mask and clutch gaps into register.

The combined brake and clutch member 13, 14 is grooved as at 20 to form a collar and is adapted to be shifted axially by means of a fork 21 resiliently coupled to the main clutch pedal 22 of the engine, as by a spring 23 reacting between a collar 24 fixed on the rod 25 and a block 26 slidable on the rod and pivotally attached to an arm 27 intended to rock the fork 21. Or the combined brake and clutch member 13, 14 may be operated independently of the main clutch. The clutch pedal 22 has a certain amount of lost motion in its connection to the engine clutch and the arrangement is such that assuming as in Fig. 1 the engine to be declutched and the vehicle at rest the brake drum 12 will be effective to hold the gear shaft 6 stationary when the positive clutch 14, 15 between the gear shaft 6 and coupling 8 of the propeller shaft is in release position. At this time the gear can be operated as ordinarily and the engine clutch let in. Before this is effected however the clutch pedal will have allowed the combined brake and clutch member 13 which is splined to the gear shaft to be moved by the spring 6a so that the brake drum is first released and the dogs 14 resiliently advanced towards the clutch member 15 and its mask 19, the gaps in which should they happen to be in register would permit the positive clutch to close. Had the act of changing speed been involved with the vehicle under way, the same conditions would have obtained except that, so long as the speed of the vehicle was such as to cause the member 15 to overrun the member 13 driven by the engine, the frictional drag of the member 13 on the mask 19 would cause the latter to lag behind the member 15 to the extent of its limited angular play thereon, so that said mask would resist entry of the dogs 14 until the engine speed increased sufficiently to cause the dogs 14 to commence to overrun the member 15 and mask whereupon ultimately the mask gaps would register with the gaps in the member 15 to allow the dogs 14 to enter.

What I claim is:—

1. In power transmission mechanism of the kind herein referred to, a clutch comprising a pair of positive clutch members, means for effecting relative axial movement of said positive clutch members to the engaged and disengaged positions a balking ring peripherally surrounding one of said positive clutch members and mounted for limited angular movement thereon to balking and non-balking positions for the other clutch member, friction means peripherally engaging said balking ring and means establishing an axially slidable driving connection between said frictional driving means and said second mentioned clutch member.

2. In power transmission mechanism of the kind herein referred to, a clutch comprising a pair of positive clutch members, one of said clutch members having positive engaging elements extending radially beyond those of the other member, means for effecting relative axial movement of said positive clutch members to the engaged and disengaged positions, a balking ring peripherally surrounding one of said positive clutch members and presenting a toothed and gapped surface to the radial extensions of the positive engaging elements of the other clutch member, said balking ring being mounted for relative angular movement on said first mentioned clutch member to balking and non-balking positions for the positive engaging elements of the second mentioned member, friction means peripherally engaging said balking ring and means establishing an axially slidable driving connection between said frictional means and said second mentioned clutch member.

3. In power transmission mechanism of the kind herein referred to, a clutch comprising a pair of clutch members having correspondingly opposing interengageable teeth and gaps, one of said clutch members being fixedly connected to a driven shaft, the other being slidably keyed on a transmission shaft, and the teeth of the second mentioned clutch member extending radially outward beyond the teeth of the first mentioned clutch member, a toothed and gapped balking ring mounted on the first mentioned clutch member to surround the same peripherally, said balking ring presenting tooth faces and gaps to the outward extensions of the teeth on the second mentioned clutch member and being angularly movable, relatively to the first mentioned clutch member between a position permitting entry of the teeth of the second mentioned clutch member into the gaps of the first mentioned clutch member and a position in which such entry is prevented, friction means peripherally engaging said balking ring and means for continuously coupling the second mentioned clutch member to said friction means without transmitting axial sliding motion to said friction means.

REGINALD WARREN.